US007417096B2

(12) United States Patent
McCormick, III et al.

(10) Patent No.: US 7,417,096 B2
(45) Date of Patent: Aug. 26, 2008

(54) PREPARATION OF TRANSITION METAL NANOPARTICLES AND SURFACES MODIFIED WITH (CO) POLYMERS SYNTHESIZED BY RAFT

(75) Inventors: Charles L. McCormick, III, Hattiesburg, MS (US); Andrew B. Lowe, Hattiesburg, MS (US); Brent S. Sumerlin, Pittsburgh, PA (US)

(73) Assignee: University of Southern Mississippi, Hattiesburg, MS (US)

(*) Notice: Subject to any disclaimer, the term of this patent is extended or adjusted under 35 U.S.C. 154(b) by 92 days.

(21) Appl. No.: 11/586,126

(22) Filed: Oct. 25, 2006

(65) Prior Publication Data

US 2007/0043179 A1 Feb. 22, 2007

Related U.S. Application Data

(62) Division of application No. 10/400,346, filed on Mar. 27, 2003, now Pat. No. 7,138,468.

(60) Provisional application No. 60/367,816, filed on Mar. 27, 2002.

(51) Int. Cl.
*C08F 214/06* (2006.01)
(52) U.S. Cl. .................. 526/89; 427/214; 427/248.1; 526/219.6; 526/227; 526/286; 526/348
(58) Field of Classification Search .......... 526/89, 526/219.6, 227, 286, 348; 427/214, 248.1
See application file for complete search history.

(56) References Cited

U.S. PATENT DOCUMENTS

| 4,581,429 A | 4/1986 | Solomon et al. ............ 526/220 |
| 4,775,636 A | 10/1988 | Moeremans et al. ........ 436/518 |
| 5,134,211 A * | 7/1992 | Farnham et al. ............ 526/217 |
| 6,153,705 A | 11/2000 | Corpart et al. ............. 525/244 |
| 6,515,088 B2 | 2/2003 | Chung ....................... 526/196 |
| 6,534,605 B2 | 3/2003 | Cameron et al. .......... 526/125.1 |
| 6,685,986 B2 * | 2/2004 | Oldenburg et al. .......... 427/214 |
| 6,692,914 B1 * | 2/2004 | Klaerner et al. ................ 435/6 |
| 6,716,948 B1 * | 4/2004 | Klaerner et al. .......... 526/303.1 |
| 2006/0093740 A1 * | 5/2006 | Park et al. ................ 427/248.1 |

FOREIGN PATENT DOCUMENTS

| WO | WO 98/01478 | 1/1998 |
| WO | WO 98/58974 | 12/1998 |
| WO | WO 99/31144 | 6/1999 |

OTHER PUBLICATIONS

Antonietti, M., et al., "Novel Amphiphilic Block Copolymers by Polymer Reactions and Their Use or Solubilization of Metal Salts and Metal Colloids", *Macromolecules* 1996, vol. 29, pp. 3800-3806.
Mayer, A.B.R., et al., "Colloidal Gold Nanoparticles Protected by Water-Soluble Homopolymers and Random Copolymers", *European Polymer Journal* 1998, vol. 34, No. 1, pp. 103-108.
Hostetler, M.J., et al., "Alkanethiolate Gold Cluster Molecules with Core Diameters from 1.5 to 5.2 nm: Core and Monolayer Properties as a Function of Core Size", *Langmuir* 1998, vol. 14, No. 1, pp. 17-30.
Chiefari, J., et al., "Living Free-Radical Polymerization by Reversible Addition-Fragmentation Chain Transfer: The RAFT Process", *Macromolecules* 1998, vol. 31, No. 16, pp. 5559-5562.
Yee, C.K., et al., "Novel One-Phase Synthesis of Thiol-Functionalized Gold, Palladium, and Iridium Nanoparticles Using Superhydride", *Langmuir* 1999, vol. 15, No. 10, pp. 3486-3491.
Yu, W., et al., "Preparation of Polymer-Stabilized Noble Metal Colloids", *Journal of Colloid and Interface Science* 1999, vol. 210, pp. 218-221.
McConnell, W.P., et al., "Electronic and Optical Properties of Chemically Modified Metal Nanoparticles and Molecularly Bridged Nanoparticle Arrays", *Journal of Physical Chemistry, B.* 2000, vol. 104, No. 38, pp. 8925-8930.
Corbierre, M.K., et al., "Polymer-Stabilized Gold Nanoparticles and Their Incorporation into Polymer Matrices", *Journal of the American Chemical Society* 2001, vol. 123, No. 42, pp. 10411-10412.
Nuβ, S., et al., "Gold Nanoparticles with Covalently Attached Polymer Chains", *Angew. Chem. Int. Ed.*, 2000, vol. 40, No. 21, pp. 4016-4018.
de la Fuente, J.M., et al., "Gold Glyconanoparticles as Water-Soluble Polyvalent Models to Study Carbohydrate Interactions", *Angew. Chem. Int. Ed.* 2001, vol. 40, No. 12, pp. 2258-2261.
Tsujii, Y., et al., "Mechanism and Kinetics of RAFT-Mediated Graft Polymerization of Styrene on a Solid Surface. 1. Experimental Evidence of Surface Radical Migration", *Macromolecules* 2001, vol. 34, No. 26, pp. 8872-8878.
Mitsukami, Y., et al., "Water-Soluble Polymers. 81. Direct Synthesis of Hydrophilic Styrenic-Based Homopolymers and Block Copolymers in Aqueous Solution via RAFT", *Macromolecules* 2001, vol. 34, No. 7, pp. 2248-2256.
Sumerlin, B.S., et al., "Water-Soluble Polymers. 84. Controlled Polymerization in Aqueous Media of Anionic Acrylamido Monomers via RAFT", *Macromolecules* 2001, vol. 34, No. 19, pp. 6561-6564.

(Continued)

*Primary Examiner*—Peter D. Mulcahy
*Assistant Examiner*—Henry Hu
(74) *Attorney, Agent, or Firm*—Howrey LLP

(57) ABSTRACT

A new, facile, general one-phase method of generating thiol-functionalized transition metal nanoparticles and surface modified by (co)polymers synthesized by the RAFT method is described. The method includes the steps of forming a (co)polymer in aqueous solution using the RAFT methodology, forming a collidal transition metal precursor solution from an appropriate transition metal; adding the metal precursor solution or surface to the (co)polymer solution, adding a reducing agent into the solution to reduce the metal colloid in situ to produce the stabilized nanoparticles or surface, and isolating the stabilized nanoparticles or surface in a manner such that aggregation is minimized. The functionalized surfaces generated using these methods can further undergo planar surface modifications, such as fuctionalization with a variety of different chemical groups, expanding their utility and application.

17 Claims, No Drawings

OTHER PUBLICATIONS

Lowe, A.B., et al., "Facile Preparation of Transition Metal Nanoparticles Stabilized by Well-Defined (Co)polymers Synthesized via Aqueous Reversible Addition-Fragmentation Chain Transfer Polymerization", *Journal of the American Chemical Society* 2002, vol. 124, No. 39, pp. 11562-11563.

Lowe, A.B., and McCormick, C.L., "Synthesis and Solution Properties of Zwitterionic Polymers", *Chemical Reviews* 2002, vol. 102, No. 11, pp. 4177-4189.

Kasemo, B., "Biological Surface Science", *Surface Science* 2002, vol. 500, pp. 656-677.

Baum, M., and Brittain, W.J., "Synthesis of Polymer Brushes on Silicate Substrates via Reversible Addition Fragmentation Chain Transfer Technique", *Macromolecules* 2002, vol. 35, No. 3, pp. 610-615.

* cited by examiner

PREPARATION OF TRANSITION METAL NANOPARTICLES AND SURFACES MODIFIED WITH (CO) POLYMERS SYNTHESIZED BY RAFT

CROSS REFERENCE TO RELATED APPLICATIONS

The present application is a divisional of U.S. application Ser. No. 10/400,346, filed Mar. 27, 2003, now U.S. Pat. No. 7,138,468 which claims priority to U.S. Provisional Patent Application Ser. No. 60/367,816 filed Mar. 27, 2002, the contents of which are incorporated herein by reference.

STATEMENT REGARDING FEDERALLY SPONSORED RESEARCH OR DEVELOPMENT

The government may own rights in the present invention pursuant to grant number DE-FC26-01BC15317 from the U.S. Department of Energy, and award number DMR-0213883 from the National Science Foundation.

FIELD OF THE INVENTION

The invention relates generally to the production of nanoparticles and surfaces and, more specifically, to the production of (co)polymer modified transition metal surfaces and nanoparticles. In particular, the preparation of transition metal nanoparticles and surfaces stabilized or modified by (co)polymers using the RAFT process in which thiocarbonylthio compounds act as chain transfer agents is disclosed, as well as their potential use in, but not limited to, optics, medicine, electronics, biochips, high-throughput screening, and biological transfer agents through further functionalization of the terminal end groups on the attached polymers. The planar surface modification of the (co)polymer stabilized surfaces of the present disclosure are also described.

BACKGROUND OF THE INVENTION

Nanoparticles are of particular interest because of their use as catalysts, photocatalysts, adsorbents, sensors, ferrofluids, and due to their applications in optical, electronic, and magnetic devices. Since the characteristics imparted by the nanoparticles are dependant to a great part on the method of preparation, the synthesis of the nanoparticles can be critical.

Thiol-stabilized nanoparticles, in particular gold nanoparticles (Au—NPS), have been the focus of intense interest lately due to their potential use in the fields of optics, immunodiagnostics, and electronics. There exist a number of examples of small molecule stabilization using alkanethiols on a variety of metal species, including gold and palladium.

Recently, research has been directed to the application of synthetic (co)polymers as stabilization species for metal nanoparticles, such as stable gold colloids prepared by in-situ reduction (Mayer, A. B. R., *Eur. Polym. Journal* 1998, 34, 103-108); ATR grafting from polymerization to attach polymer chains to gold nanoparticles (Nu, S., et al. *Angew. Chem. Int. Ed.* 2001, 40, 4016-4018); gold nanoparticles decorated with covalently bound thiol-capped polystyrene macromolecules (Corbierre, M. K, et al. *J. Am. Chem. Soc.* 2001, 123, 10411-10412); and platinum nanoparticles with long perfluorinated carbon chains (Moreno-Mañas, M., et al. *Chem. Commun.* 2002, 60-61). However, these examples use processes of "grafting-to" and "grafting-from" for nanoparticle stabilization that utilize living polymerization techniques and suffer from disadvantages such as special reaction conditions, sensitivity to specific monomers, and necessitate expensive reagents and/or monomers.

Additional research in the area of nanoparticle synthesis has focused on the development of "pseudo-living" polymerization methods. Three principal approaches have been described to achieve this pseudo-living free-radical polymerization technique; reversible termination, reversible termination by ligand-transfer, and degenerative chain transfer. The first of these, typically referred to as nitroxide-mediated or stable free-radical polymerization (SFRP) has been exploited in the synthesis of controlled styrenic-based (co)polymers (Solomon, D. H., et al. U.S. Pat. No. 4,581,429; Goto, A.; et al. *Macromolecules* 1996, 29, 3050; Yoshida, E., et al. *J Polym. Sci., Part A: Polym. Chem.* 1997, 35, 2371).

Subsequently, several groups disclosed an atom transfer radical polymerization (ATRP) process, which is a radical polymerization with reversible termination by ligand transfer to a metal complex. This technique has been shown to work especially well with styrenic and acrylate-based polymer monomers, similar to SFRP (Wang, J.-S., et al. *Macromolecules* 1995, 28, 7572; Sawamoto, M., et al., *Trends Polym. Sci.* 1996, 4, 371; Bandts, J. A. M., et al. *J Organomet. Chem.* 1999, 584, 246).

Most recently, a third mechanism has been proposed for achieving "pseudo-living" polymerization character, which is a free-radical polymerization with reversible chain transfer (also termed degenerative chain transfer). It has been termed RAFT—reversible addition-fragmentation chain transfer polymerization (Le, T. P., et al., WO Patent 9801478; Chiefari, J., et al. *Macromolecules* 1998, 31, 5559-5562; Moad, G., et al. *Polym. Int.* 2000, 49, 993). This technique appears to offer several advantages over the previous ATRP and SFRP techniques, in that a vast array of monomers can be used, and the reaction can be performed under a broad range of experimental conditions using a variety of solvents.

Despite these recent advances, few methods have been described which allow for the covalent attachment of polymer chains directly to transition metal colloids or surfaces (the so-called grafting-to approach), as opposed to simple physical adsorption of a (co)polymer. Thus, there exists a need for a new, facile manner for the preparation of (co)polymer stabilized transition metal nanoparticles and surfaces. The approach described herein takes advantage of the method of polymer synthesis in which the polymers produced bear thiocarbonylthio end groups which can be reduced in situ in the presence of a transition metal sol or surface, yielding a polymer with a thiolate end-group which covalently bonds to the metal colloid or metal surface. This fast, facile, "one-step" synthetic procedure of simultaneous reduction of the polymer end-group and the metal colloid or surface in situ is significantly less demanding than the grafting-from approach which requires initial modification of the metal colloid with a suitable polymerization initiator, followed by subsequent polymerization. This new, rapid one-step method allows for the preparation of polymers suitable for covalent attachment on an industrial scale.

SUMMARY OF THE INVENTION

The present invention relates to a novel, inexpensive and convenient process for the preparation of transition metal nanoparticles and surfaces which are modified by (co)polymers synthesized using the RAFT technique.

More specifically, a facile method of preparing transition metal nanoparticles and surfaces stabilized or modified by (co)polymers synthesized using the RAFT technique includes the steps of: forming a dithio end-capped (co)polymer by reacting at least one polymerizable monomer or co-monomer with a free radical source and a chain transfer agent, such as a dithioester, using the RAFT method in a solvent; forming a metal precursor colloidal solution from a transition metal in a solvent; introducing the metal is precursor colloidal solution to the dithio end-capped (co)polymer, in an open-atmosphere setup; adding a reducing agent into the solution to reduce the metal colloidal salt or sol and the thiocarbonylthio compound in situ in order to produce the nanoparticles; mixing the solution for a period of time sufficient to stabilize the nanoparticles; concentrating the stabilized nanoparticles and separating the by-products by centrifugation; and concentrating the stabilized nanoparticles in a manner such that aggregation is minimized.

Further, within the invention, preferably transition metal nanoparticles or surfaces are stabilized or modified by a (co)polymer which is cationic, anionic, non-ionic, or zwitterionic in a aqueous or partially aqueous solution or emulsion. The precursor colloidal solution can be introduced to the dithio end-capped (co)polymer in an open atmosphere environment.

A facile method of preparing transition metal surfaces modified by (co)polymers synthesized using the RAFT technique for use in forming polymer-modified transition metal films and surfaces is also described, including the steps of: forming a dithio end-capped (co)polymer by reacting at least one polymerizable monomer or co-monomer with a free radical source and a chain transfer agent, such as a dithioester, using the RAFT method in a solvent; introducing a metal surface to the dithio end-capped (co)polymer solution; adding a reducing agent into the solution to reduce the metal surface (colloid, film, etc) and the thiocarbonylthio compound in situ; and allowing the solution and metal surface to remain in contact for a period of time sufficient to stabilize the transition metal surface.

Additionally, in forming the polymer-modified transition metal films and surfaces, the isolation of the slide/surface also includes the steps of removing the polymer-modified transition metal surface from the solution in order to separate the by-products from the synthesis; adding a solvent, such as water, to the face of the slide/surface in order to rinse the stabilized surface; and optionally drying the (co)polymer stabilized surface in a manner such that aggregation of the nanoparticles is minimized.

The above-mentioned innovations may be employed individually, or in combination, to control the composition and performance of the nanoparticles or surfaces formed.

DEFINITIONS

The following definitions are provided in order to aid those skilled in the art in understanding the detailed description of the present invention.

"Chain transfer agents" (CTA) as used herein refer to those compounds useful in polymeric reactions having the ability to add monomer units to continue a polymerization process.

"Free-radical initiators" (initiators) as used herein refer to a species comprising any of the large number of organic compounds with a labile group which can be readily broken by heat or irradiation (UV, gamma, etc.) and have the ability to initiate free radical chain reactions.

"Monomer" as used herein means a polymerizable allylic, vinylic, or acrylic compound which may be anionic, cationic, non-ionic, or zwitterionic.

"Anionic copolymers" as used herein, refer to those (co)polymers which possess a net negative charge.

"Anionic monomer" as defined herein refers to a monomer which possesses a net negative charge. Representative examples of anionic monomers include metal salts of acrylic acid, sulfopropyl acrylate, methacrylate, or other water-soluble forms of these or other polymerizable carboxylic acids or sulphonic acids, and the like.

"Cationic (co)polymers", as defined herein, refer to those (co)polymers which possess a net positive charge.

"Cationic monomers", as defined herein, refer to those monomers which possess a net positive charge. Representative cationic monomers include the quaternary salts of dialkylaminoalkyl acrylates and methacrylates, N,N-diallydialkyl ammonium halides (such as DADMAC), N,N-dimethylaminoethylacrylate methyl chloride quaternary salt, and the like.

"Neutral" or "non-ionic (co)polymers", as defined herein, refer to those (co)polymers which are electrically neutral and possess no net charge.

"Nonionic monomers" are defined herein to mean a monomer which is electrically neutral. Representative nonionic or neutral monomers are acrylamide, N-methylacrylamide, N,N-dimethyl(meth)acrylamide, N-methylolacrylamide, N-vinylformamide, and N,N-dimethylacrylamide, as well as hydrophilic monomers such as ethylene glycol methyacrylate, diols, triols, and the like.

"Betaine", as used herein, refers to a general class of salt compounds, especially zwitterionic compounds, and include polybetaines. Representative examples of betaines which can be used with the present invention include: N,N-dimethyl-N-acryloyloxyethyl-N-(3-sulfopropyl)-ammonium betaine, N,N-dimethyl-N-acrylamidopropyl-N-(2-carboxymethyl)-ammonium betaine, N,N-dimethyl-N-acrylamidopropyl-N-(3-sulfopropyl)-ammonium betaine, N,N-dimethyl-N-acrylamidopropyl-N-(2-carboxymethyl)-ammonium betaine, 2-(methylthio)ethyl methacryloyl-S-(sulfopropyl)-sulfonium betaine, 2-[(2-acryloylethyl)dimethylammonio]ethyl 2-methyl phosphate, 2-(acryloyloxyethyl)-2'-(trimethylammonium)ethyl phosphate, [(2-acryloylethyl)dimethylammonio]methyl phosphonic acid, 2-methacryloyloxyethyl phosphorylcholine (MPC), 2-[(3-acrylamidopropyl) dimethylammonio]ethyl 2'-isopropyl phosphate (AAPI), 1-vinyl-3-(3-sulfopropyl)imidazolium hydroxide, (2-acryloxyethyl)carboxymethyl methylsulfonium chloride, 1-(3-sulfopropyl)-2-vinylpyridinium betaine, N-(4-sulfobutyl)-N-methyl-N,N-diallylamine ammonium betaine (MDABS), N,N-diallyl-N-methyl-N-(2-sulfoethyl)ammonium betaine, and the like.

"Zwitterionic", as defined herein, refers to a molecule containing both cationic and anionic substituents or electronic charges. Such molecules can have a net neutral overall charge, or can have a net positive or net negative overall electronic charge.

"Zwitterionic (co)polymers", as defined herein, refer to (co)polymers derived from a zwitterionic monomer, a combination of anionic and cationic charged monomers or those derived from a zwitterionic monomer, including betaines, together with a component or components derived from other betaine monomers, ionic monomers, and non-ionic monomer(s), such as a hydrophobic and/or hydrophilic monomer. Suitable hydrophobic, hydrophilic, and betaine monomers are any of those known in the art. Representative zwitterionic co(polymers) include homopolymers, terpolymers, and (co)polymers. In polybetaines, all the polymer chains and segments within those chains is are necessarily electrically neutral. As a result, polybetaines represent a subset of polyzwitterions, necessarily maintaining charge neutrality across all polymer chains and segments due to both anionic charge and cationic charge being introduced within the same monomer (see, for example, Lowe A. B., et al., *Chemical Reviews* 2002, Vol. 102, pp. 4177-4189, which is incorporated herein by reference).

"Zwitterionic monomer" means a polymerizable molecule containing cationic and anionic (thus, charged) functionalities in equal proportions, such that the molecule is typically, but not always, electronically neutral overall. Those monomers containing charges on the same monomer are termed "polybetaines."

"Transition metal complex", or "transition metal sol", as defined herein, refers to a metal colloid solution/complex, wherein the metal is any of the metals comprising the d-block section of the Periodic Table of Elements that, as elements, have partly filled d shells in any of their commonly occurring oxidation states, constituting those elements in the first, second and third transition series, as defined by IUPAC.

"Living polymerization", as used herein, refers to a process which proceeds by a mechanism whereby most chains continue to grow throughout the polymerization process, and where further addition of monomer results in continued polymerization. The molecular weight is controlled by the stoichiometry of the reaction.

"Radical leaving group" refers to a group attached by a bond that is capable of undergoing homolytic scission during a reaction, thereby forming a radical.

"Stabilized" refers to the transition-metal-stabilized nanoparticles of the present invention, and refers to the ability of the colloids to resist aggregation for several weeks after preparation under an air atmosphere.

"Surface", as used herein, refers to the exterior, external, upper, or outer boundary of an object or body, and is meant to include a plane or curved two-dimensional locus of points as the boundary of a three-dimensional region, e.g. a plane.

"GPC number average molecular weight", (Mn) means a number average molecular weight, determined by Aqueous Size Exclusion Chromatography (ASEC).

"GPC weight average molecular weight", (Mw) means a weight average molecular weight measured by utilizing gel permeation chromatography.

"Polydispersity" (Mw/Mn) means the value of the GPC weight average molecular weight divided by the GPC number average molecular weight.

Unless specified otherwise, alkyl groups referred to in this specification can be branched or unbranched and contain from 1 to 20 carbon atoms. Alkenyl groups can similarly be branched or unbranched, and contain from 2 to 20 carbon atoms. Saturated or unsaturated carbocyclic or heterocyclic rings can contain from 3 to 20 carbon atoms. Aromatic carbocyclic or heterocyclic rings can contain from 5 to 20 carbon atoms.

"Substituted", as used herein, means that a group can be substituted with one or more groups that are independently selected from the group consisting of alkyl, aryl, epoxy, hydroxy, alkoxy, oxo, acyl, acyloxy, carboxy, carboxylate, sulfonic acid, sulfonate, alkoxy- or aryloxy-carbonyl, isocyanato, cyano, silyl, halo, dialkylamino, and amido. All substituents are chosen such that there is no substantial adverse interaction under the conditions of the experiments.

DETAILED DESCRIPTION OF THE INVENTION

Generally, the present disclosure describes an inexpensive and efficient process for preparing transition metal nanoparticles or other suitable surfaces modified by (co)polymers prepared using the RAFT process. This is shown generally in schemes 1 and 2 below. As described in detail herein, and as illustrated in scheme 1, the nanoparticles of the invention are synthesized by the reaction of a transition metal complex, such as a metal salt, colloid, or sol, with thiocarbonylthio compounds in aqueous solution, in the presence of a reducing agent. According to this aspect of the present disclosure, the methods described simultaneously reduce the metal salt (or sol) and the thiocarbonylthio group to a thiol in one step, in situ. The structuro-terminal end-groups (X) of the thus-anchored (co)polymers of this invention could act as active end groups in numerous applications, allowing for a variety of chemistries to be performed, such as the chemical modification of the terminal end-group.

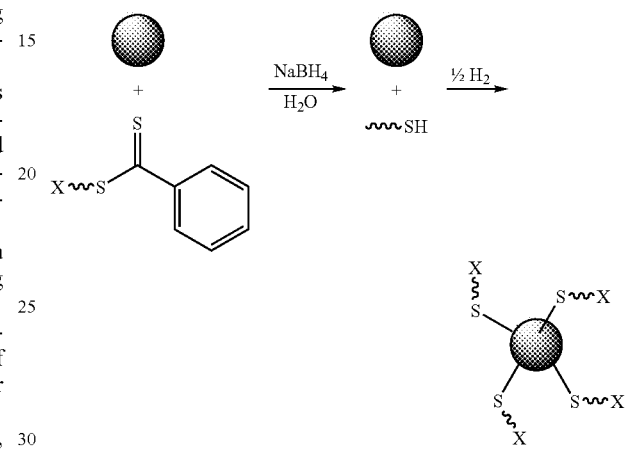

Scheme 1. General preparation of (co)polymer stabilized transition metal nanoparticles, by the in-situ reduction and immobilization of a RAFT-prepared (co)polymer on a nanoparticle, wherein X represents a variety of functional groups.

A further embodiment of the present disclosure is illustrated in scheme 2, wherein surfaces such as films, metals, and the like are reacted with thiocarbonylthio compounds or other CTAs in aqueous solution, in the presence of at least one reducing agent. Similar to the process described for use with nanoparticles, the thiocarbonylthio compounds are reduced to thiols in situ, causing the surfaces to be modified, and the structuro-terminal end groups, X, can be further functionalized in a variety of manners.

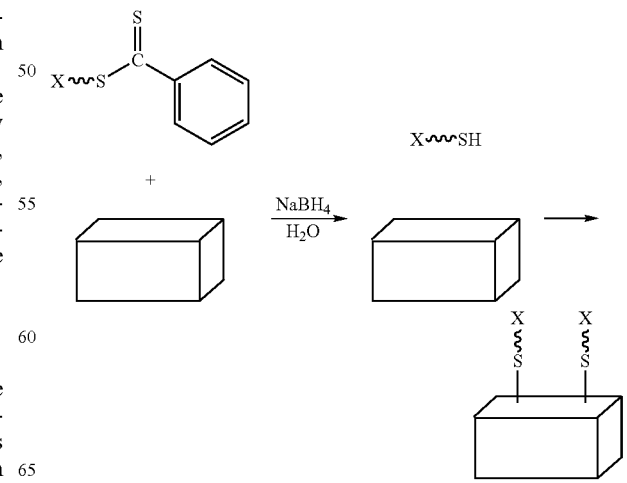

Scheme 2. Basic mechanism describing the in-situ reduction and immobilization of a RAFT-prepared (co)polymer on a surface, wherein X represents a variety of functional groups.

As alluded to above, it is further envisioned that the structuro-terminal end-groups (X) of the thus-anchored (co)polymers of this invention could act as active end groups in numerous applications, allowing for a variety of functionalities to be attached to these groups. Functional groups which can be anchored to surfaces and nanoparticles via (co)polymers according to the present invention include, but are not limited to, amines (primary, secondary, and tertiary), amides, carbonyls, nitroso compounds, halides, alcohols, carboxylic acids and their associated salts, esters, anhydrides, and acid halides.

By way of example only, compounds which could be anchored to a carbonyl end group of the anchored polymeric chain would include, but are not limited to, DNA, RNA, DNA and RNA sequences, nucleotides, oligonucleotides, recombinant oligonucleotides, nucleosides, saccharides, polysaccharides, proteins, glycoproteins, lipoproteins, lipids, alcohols, steroids, peptides including recombinant proteins and polypeptides, amino acids (natural, non-natural, and synthetic), lectins, enzymes, PNAs, peptoids, glycosphingolipids, and hormones. For example, thiol groups could be introduced into the system by way of a free carboxylic acid end group by coupling an amino acid such as cysteine (or derivatives thereof) using standard amide bond forming techniques (e.g., peptide bond formation using carbodiimide chemistry).

Methods of attachment to the functionalized end-groups would include any of the methods known in the art for performing such chemistry, which may be either by traditional solution phase synthesis methods or by solid phase synthesis methods, in an automated or non-automated fashion. Examples of such methods for synthesis are described in M. Bodanszky, *Principles of Peptide Synthesis*, $2^{nd}$ Ed., Springer-Verlag, Berlin, 1993; J. Jones, *Amino Acid and Peptide Synthesis*, Oxford University Press, New York, 1997; and B. Bunin, *The Combinatorial Index*, Academic Press, San Diego, 1998. Such methods would include but are not limited to amide bond forming reactions using active esters, azides, enzymes, N-carboxyanhydrides, active ester methods, carbodiimide reagents and methods, methods using Woodward reagent K, carbodiimidazole methods, oxidation-reduction methods, acyl halides, anhydrides (symmetrical and mixed), methods using phosphonium and uronium reagents such as BOP, HBTU, TBTU, and PyBrOP, and other methods which would be obvious to one of skill in the art.

Illustrative of the methods useful for attaching DNA segments, RNA segments, and bridging or non-bridging nucleotides to the nanoparticles and surfaces of this invention are solution-phase synthesis, solid-phase synthesis, automated solid-phase synthesis, automated solution-phase synthesis, phosphoramidite chemistry, phosphorothioamidite chemistry, hydrogen-phosphonate methods, and other known methods of oligonucleotide synthesis as shown in the following references, which are hereby incorporated by reference: U.S. Pat. No. 4,458,066, U.S. Pat. No. 4,500,707; *J. Am. Chem. Soc.* 1981, 3185-3191; Jones, Chapter 2, and Atkinson, et al., Chapter 3, in Gait, ed., Oligonucloetide Synthesis: A Practical Approach (1984); Brill, et al. *J. Am. Chem. Soc.* 1989, 2321; and Froehler, et al. *Nucleic Acids Res.* 1986, 5399-5407. Furthermore, less-common modes of incorporation, such as enzymatic (*Bioorg. Khim.* 1987, 13, 1045-52) and methods of producing sulfurized oligonucleotide analogs (*Nucleosides & Nucleotides* 1989, 967-68); (*Tetrahedron Letters* 1986, 5575-5578); (*Tetrahedron Letters* 1991, 3005-3008) are also envisioned using the nanoparticles of this invention.

While not wishing to be bound to any one particular mechanism, it is believed that RAFT polymerizations with a singly-functional chain transfer agent (CTA), such as a dithioester, occur by the mechanism illustrated in scheme 3. Briefly, an initiator produces a free radical, which subsequently reacts with a polymerizable monomer. The monomer radical reacts with other monomers and propagates to form a chain, $P_n\cdot$, which can react with a CTA. The CTA can fragment, either forming $R\cdot$, which will react with another monomer that will form a new chain, $P_m\cdot$, or $P_n\cdot$, which will continue to propagate. In theory, the propagation of $P_m\cdot$ and $P_n\cdot$ will continue until no monomer remains or termination occurs. After the first polymerization has finished, in particular circumstances, a second monomer can be added to the system to form a block copolymer. The present invention can be used to form block copolymers attached to transition-metal nanoparticles.

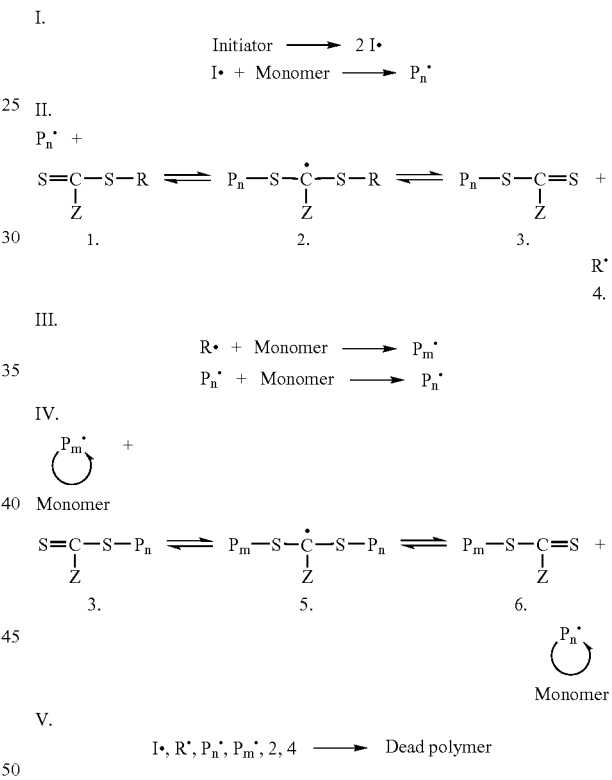

Scheme 3.

Suitable polymerization monomers and comonomers of the present invention include, but are not limited to, methyl methacrylate, ethyl acrylate, propyl methacrylate (all isomers), butyl methacrylate (all isomers), 2-ethylhexyl methacrylate, isobornyl methacrylate, methacrylic acid, benzyl methacrylate, phenyl methacrylate, methacrylonitrile, alpha-methylstyrene, methyl acrylate, ethyl acrylate, propyl acrylate (all isomers), butyl acrylate (all isomers), 2-ethylhexyl acrylate, isobornyl acrylate, acrylic acid, benzyl acrylate, phenyl acrylate, acrylonitrile, styrene, acrylates and styrenes selected from glycidyl methacrylate, 2-hydroxyethyl methacrylate, hydroxypropyl methacrylate (all isomers), hydroxybutyl methacrylate (all isomers), N,N-dimethylaminoethyl methacrylate, N,N-diethylaminoethyl methacrylate, triethyleneglycol methacrylate, itaconic anhydride, itaconic acid, glycidyl acrylate, 2-hydroxyethyl acrylate, hydroxypropyl acrylate (all isomers), hydroxybutyl acrylate (all isomers), N,N-dimethylaminoethyl acrylate, N,N-diethylaminoacrylate, triethyleneglycol acrylate, methacrylamide, N-methylacrylamide, N,N-dimethylacrylamide, N-tert-butylmethacrylamide, N-n-butylmethacrylamide, N-methylolacrylamide, N-ethylolacrylamide, vinyl benzoic acid (all isomers), diethylaminostyrene (all isomers), alpha-methylvinyl benzoic acid (all isomers), diethylamino alpha-methylstyrene (all isomers), p-vinylbenzenesulfonic acid, p-vinylbenzene sulfonic sodium salt, trimethoxysilylpropyl methacrylate, triethoxysilylpropyl methacrylate, tributoxysilylpropyl methacrylate, dimethoxymethylsilylpropyl methacrylate, diethoxymethylsilylpropyl methacrylate, dibutoxymethylsilylpropyl methacrylate, diisopropyoxymethylsilylpropyl methacrylate, dimethoxysilylpropyl methacrylate, diethoxysilylpropyl methacrylate, dibutoxysilylpropyl methacrylate, diisopropoxysilylpropyl methacrylate, trimethoxysilylpropyl acrylate, triethoxysilylpropyl acrylate, tributoxysilylpropyl acrylate, dimethoxymethylsilylpropyl acrylate, diethoxymethylsilylpropyl acrylate, dibutoxymethylsilylpropyl acrylate, diisopropoxymethylsilylpropyl acrylate, dimethoxysilylpropyl acrylate, diethoxysilylpropyl acrylate, dibutoxysilylpropyl acrylate, diisopropoxysilylpropyl acrylate, vinyl acetate, vinyl butyrate, vinyl benzoate, vinyl chloride, vinyl flouride, vinyl bromide, maleic anhydride, N-phenyl maleimide, N-butylmaleimide, N-vinylpyrrolidone, N-vinylcarbazole, betaines, sulfobetaines, carboxybetaines, phosphobetaines, butadiene, isoprene, chloroprene, ethylene, propylene, 1,5-hexadienes, 1,4-hexadienes, 1,3-butadienes, and 1,4-pentadienes.

Additional suitable polymerizable monomers and comonomers include, but are not limited to, vinyl acetate, vinyl alcohol, vinylamine, N-alkylvinylamine, allylamine, N-alkylallylamine, diallylamine, N-alkyldiallylamine, alkylenimine, acrylic acids, alkylacrylates, acrylamides, methacrlic acids, maleic anhydride, alkylmethacrylates, methacrylamides, N-alkylacrlamides, N-alkylmethacrylamides, n-vinyl formamide, vinyl ethers, vinyl naphthalene, vinyl pyridine, vinyl sulfonates, ethylvinylbenzene, aminostyrene, vinyl biphenyl, vinyl anisole, vinylimidazolyl, vinylpyridinyl, dimethylaminomethystyrene, trimethylammonium ethyl methacrylate, trimethylammonium ethyl acrylate, dimethylamino propylacrylamide, trimethylammonium ethylacrylate, trimethylammonium ethyl methacrylate, trimethylammonium propyl acrylamide, dodecyl acrylate, octadecyl acrylate, and octadecyl methacrylate.

The free-radical polymerization initiators, or free radical source, of the present invention are chosen from the initiators conventionally used in radical polymerization, such as azo-compounds, hydrogen peroxides, redox systems, and reducing sugars. More specifically, the source of free radicals suitable for use with the present invention can also be any suitable method of generating free radicals, including but not limited to thermally induced homoytic scission of a suitable compound or compounds (s) [thermal initiators include peroxides, peroxyesters, and azo-compounds], redox initiating systems, photochemical initiating systems, or high energy radiation such as electron beam, X-ray, or gamma-ray radiation. The initiating system is chosen such that under the reaction conditions, there is no substantial adverse interaction of the initiator, the initiator conditions, or the initiating radicals with the transfer agent under the conditions of the procedure. The initiator should also have the requisite solubility in the reaction medium or monomer mixture.

Thermal initiators are chosen to have an appropriate half-life at the temperature of polymerization. These initiators can include, but are not limited to, one or more of 2,2'-azobis (isobutyronitrile), 2,2'-azobis(2-cyano-2-butane), dimethyl 2,2'-azobisdimethylisobutyrate, 4,4'-azobis(4-cyanopentanoic acid), 1,1'-azobis(cyclohexanecarbonitrile), 2-(t-butylazo)-2-cyanopropane, 2,2'-azobis[2-methyl-N-(1,1)-bis(hydroxyethyl)]-propionamide, 2,2'-azobis(N,N'-dimethyleneisobutylamine), 2,2'-azobis[2-methyl-N-(2-hydroxyethyl)propionamide], 2,2'-azobis(isobutyramide) dihydrate, 2,2'-azobis(2,2,4-trimethylpentane), 2,2'-azobis (2-methylpropane, t-butyl peroxyacetate, t-butyl peroxybenzoate, t-butyl peroxyoctoate, t-butyl peroxyneodecanoate, t-butylperoxy isobutyrate, t-amy peroxypivalate, t-butyl peroxypivalate, di-isopropyl peroxydicarbonate, dicyclohexyl peroxydicarbonate, dicumyl peroxide, dibenzoyl peroxide, dilauroyl peroxide, potassium peroxydisulfate, ammonium peroxydisulfate, di-t-butyl hyponitrite, and dicumyl hyponitrite.

Examples of hydrogen peroxides which may act as free-radical initiators according to the present disclosure include, but are not limited to, tert-butyl hydroperoxide, cumene hydroperoxide, tert-butyl peroxyacetate, lauroyl peroxide, tert-amyl peroxypivalate, tert-butyl peroxypivalate, dicumyl peroxide, hydrogen peroxide, $Bz_2O_2$ (dibenzoyl peroxide), potassium persulphate, and ammonium persulphate.

Photochemical initiator systems are chosen to have the requisite solubility in the reaction medium, monomer mixture, or both, and have an appropriate quantum yield for radical production under the conditions of the polymerization. Examples include, but are not limited to, benzoin and benzoin derivatives, benzophenone and benzophenone derivatives, acyl phosphine oxides, and photo-redox systems.

Redox initiator systems are chosen to have the requisite solubility in the reaction medium, monomer mixture, or both, and have an appropriate rate of radical production under the conditions of the specific polymerization. Such initiating systems suitable for use with the present disclosure can include combinations of oxidants such as potassium peroxydisulfate, hydrogen peroxide, t-butyl hydroperoxide, and reductants such as iron (II), titanium (III), potassium thiosulfite, and potassium bisulfite. Other suitable initiating systems are described in Moad and Solomon, "The Chemistry of Free Radical Polymerization," Pergamon, London, 1995; pp. 53-95, which is incorporated herein by reference.

Further examples of redox systems suitable for use with the present disclosure include, but are not limited to, mixtures of hydrogen peroxide or alkyl peroxide, peresters, percarbonates, and the like in combination with any one of the salts of iron, titaneous salts, zinc salts, zinc formaldehyde sulphoxylate, sodium salts, or sodium formaldehyde sulphoxylate.

The reactions of the present disclosure (e.g., polymerizations, surface modifications/immobilizations, and preparations of polymer-stabilized metal colloids or other appropriate surfaces, such as silicon, ceramic, metals, etc.) can be carried out in any suitable solvent or mixture thereof. Suitable solvents include, but are not limited to, water, alcohol (e.g. methanol, ethanol, n-propanol, isopropanol, butanol), tetrahydrofuran (THF), dimethyl sulfoxide (DMSO), dimethylformamide (DMF), acetone, acetonitrile, hexamethylphosphoramide (HMPA), hexane, cyclohexane, benzene, toluene, methylene chloride, ether (e.g. diethyl ether, butyl ether or methyl tert-butyl ether), methyl ethyl ketone (MEK), chloroform, ethyl acetate, and mixtures thereof. Preferably, the solvents include water, mixtures of water, or mixtures of water and water-miscible organic solvents, such as DMF. Most preferably, water is the solvent.

For heterogeneous polymerization, it is desirable to choose a CTA which has appropriate solubility characteristics. For example, for aqueous emulsion polymerization, the CTA should preferably partition in favor of the organic (monomer) phase and yet have sufficient aqueous solubility that it is able to distribute between the monomer droplet phase and the polymerization locus.

The chain transfer reagents (CTAs) of the present invention are compounds, such as dithioester compounds, water-soluble dithioeser compounds, disulphides, xanthate disulphides, thiocarbonylthio compounds, and dithiocarbamates which react with either the primary radical or a propagating polymer chain, thereby forming a new CTA and eliminating the R radical, thereby reinitiating polymerization. The CTAs of the present invention are either commercially available, such as carboxymethyl dithiobenzoate, or readily synthesized using known procedures. Examples of CTAs suitable for use in the present invention are cumyl dithiobenzoate, DTBA (4-cyanopentanoic acid dithiobenzoate), BDB (benzyl dithiobenzoate), CDB (isopropyl cumyl dithiobenzoate), TBP (N,N-dimethyl-s-thiobenzoylthiopropionamide), TBA (N,N-dimethyl-s-thiobenzoylthioacetamide, trithiocarbonates, dithiocarbamates, (phosphoryl)dithioformates and (thiophosphoryl)dithioformates, bis(thioacyl)disulfides, xanthates, dithiocarbonate groups used in MADIX (Macromolecular Design via Interchange of Xanthate) which are either commercially available, synthesized according to well-established organic synthesis routes, or synthesized as previously described in U.S. Pat. No. 6,153,705, which is hereby incorporated by reference, and CTPNa (sodium 4-cyanopentanoic acid dithiobenzoate) and related compounds, such as those described in U.S. Pat. No. 6,153,705, and PCT International Application WO 9801478 A1, which are herein incorporated by reference.

The choice of polymerization conditions is also important. The reaction temperature should generally be chosen such that it will influence rate in the desired manner. For example, higher temperatures will typically increase the rate of fragmentation. Conditions should be chosen such that the number of chains formed from initiator-derived radicals is minimized to an extent consistent with obtaining an acceptable rate of polymerization. The polymerization process of the present invention is performed under conditions typical of conventional free-radical polymerization. Polymerization employing the CTAs described above are suitably carried out with temperatures in the range of −20° C. to 200° C., preferably in the range of 10° C. to 150° C., and most preferably at temperatures in the range of 10° C. to 80° C.

The pH of a polymerization conducted in an aqueous or semi-aqueous solution can be varied depending upon the conditions and the reactants. Generally, however, the pH is selected so that the selected dithioester is stable and grafting of the polymer can occur. Typically, the pH is from about 0 to about 9, preferably from about 1 to about 7, and more preferably from about 2 to about 7. The pH can be adjusted using any of the means known in the art.

The surfaces which are suitable for use with the (co)polymers of the present invention include, but are not limited to, transition metals of the first transition series (titanium, vanadium, chromium, manganese, iron, cobalt, nickel, copper, and zinc), the second transition series (zirconium, molybdenum, technetium, ruthenium, rhodium, palladium, silver, cadmium and indium) and the third transition series (hafnium, tantalum, tungsten, rhenium, osmium, iridium, platinum, and gold), in any form or shape, such as nanoparticles, films, wafers, solids, and the like; silicon wafers; silicon chips; biochip surfaces; biomimetic materials; metals, such as stainless steel; ceramics; carbon materials; polymers such as PTFE and PMMA; and composite materials.

More specifically, representative transition metals suitable for use in the present invention include, but are not limited to, those transition metals in the second and third transition metal series of the d-block elements, having coordination numbers of at least 4 and at most 6, and either planar or octahedral geometries. Representative transition metal sols preferred for use in this invention include, but are not limited to, complexes formed from silver (Ag) and associated salts (e.g., $AgNO_3$), gold (Au) and associated salts(e.g., $HAuCl_4.4H_2O$), ruthenium (Ru) and associated salts (e.g., $K_3RuCl_6$), osmium (Os) and associated salts (e.g., $Na_2OsCl_6.H_2O$), rhodium (Rh) and its associated salts (e.g., $NaRhCl_6$), iridium (Ir) and its associated salts (e.g., $Na_2IrCl_6.6H_2O$), palladium (Pd) and its associated salts (e.g., $Na_2PdCl_6.6H_2O$) and platinum (Pt) and associated salts (e.g., $Na_2PtCl_6.6H_2O$).

Examples of azo-compounds which may act as free-radical initiators according to the present invention include, but are not limited to, AIBMe (2,2'-azobis(methyl isobutyrate), AIBN (2,2'-azobis(2-cyanopropane), ACP (4,4'-azobis(4-cyanopentanoic acid), AB (2,2'-azobis(2-methylpropane), 2,2'-azobis(isobutyronitrile), 2,2'-azobis(2-butanenitrile), 2,2'-azobis[2-methyl-N-(1,1)-bis(hydroxymethyl)-2-hydroxyethyl]propionamide, and 2,2'-azobis(2-amidinopropane)dichloride.

Table 1 shows a summary of the molecular weights and polydispersities of the (co)polymers utilized for this study. While any water soluble (co)polymer could be used, the (co)polymers envisioned for use according the present invention are anionic, cationic, neutral, and/or zwitterionic (betaine) species.

TABLE 1

Summary of the molecular characteristic of the RAFT-synthesized (co)polymers employed as stabilizing species.

| Polymer | $M_n^a$ | $M_w/M_n^a$ | Composition |
|---|---|---|---|
| PAMPS ($P_1$) | 17,700[b] | 1.27 | — |
| PVBTAC ($P_2$) | 10,500[c] | 1.06 | — |
| PDMA ($P_3$) | 29,100[d] | 1.18 | — |
| P(MAEDAPS-b-PDMA) ($P_4$) | 58,700[b] | 1.19 | 35:65[e] MAEDAPS:DMA |

[a]As determined by Aqueous Size Exclusion Chromatography (ASEC);
[b]Reported as $PNaSSO_3$ equivalents;
[c]Reported as P2VP equivalents;
[d]Absolute MW as determined by on-line light scattering (Wyatt DAWN EOS Optilab RI detector);
[e]As determined by $^1$H-NMR spectroscopy.

Suitable anionic (co)polymers include PAMPS (poly(sodium 2-acrylamido-2-methylpropanesulfonate), PAMBA, and other suitable anionic (co)polymers known in the art. Preparation of such anionic (co)polymers is known in the art, and is herein incorporated by reference (Sumerlin, B., et al. *Macromolecules* 2001, 34, 6561).

Suitable cationic (co)polymers include PVBTAC (poly(arvinylbenzyl)trimethylammonium chloride), and other related cationic (co)polymers which are commercially available or available through known synthetic routes.

Suitable nonionic, or neutral (co)polymers include representative (co)polymers including, but not limited to, PDMA (poly(N,N-dimethylacrylamide), and other related neutral (co)polymers which are commercially available or available through known synthetic procedures.

Suitable zwitterionic (co)polymers include PMAEDAPS-b-PDMA (poly(3-[2-N-methylacrylamido)-ethyl dimethyl ammonio propanesulfonate-block-N,N-dimethylacrylamide), and other zwitterionic (co)polymers commercially available or available through known synthetic procedures.

Preferably, the zwitterionic (co)polymer useful in the present invention comprises a component derived from a zwitterionic monomer (betaine) together with a component or components derived from a hydrophobic or hydrophilic monomer or a mixture of components derived from hydrophobic and hydrophilic monomers.

Suitable betaines include, but are not limited to, ammonium carboxylates, ammonium phosphates, and ammonium sulphonates. Particular zwitterionic monomers which can be utilized are N-(3-sulphopropyl)-N-methylacryloxyethyl-N,N-dimethyl ammonium betaine, and N-(3-sulphopropyl)-N-allyl-N,N-dimethyl ammonium betaine.

The dithioester-end capped (co)polymers used in the present invention were synthesized using a controlled synthesis in aqueous media, employing any number of chain-transfer agents, most preferably a dithiobenzoate or related compound as described above, and a free radical initiator. The RAFT processes of the present invention can be carried out in aqueous media, in bulk, solution, emulsion, microemulsion, mini-emulsion, inverse emulsion, inverse microemulsion, or suspension, in either a batch, semi-batch, continuous, or feed mode. The initiators are the free-radical initiators described above, with the azo- initiators being preferred. (Co)polymer molecular masses were controlled by varying the monomer-to-CTA molar ratio. The initiator-to-CTA molar ratio as at least one-to-one (1:1), and at most 1:1000. The initiator-to-CTA molar ratio was generally in an amount such that the molar amount of CTA was greater than the molar amount of initiator. Preferably, the initiator-to-CTA molar ratio was at least 1:1, at most 1:100, and most preferably 1:5 in order to obtain optimal results. Solution pH was adjusted as necessary to ensure complete ionization of the monomers, depending on the charge.

Turning now to an exemplary process according to the invention, the synthesis begins with the preparation of an aqueous solution of metal salt or sol, preferably the amount of metal salt or sol being 0.01 wt. %. This metal colloidal solution is then preferentially added to a container which has been charged with a dithioester end-capped (co)polymer, as described above. The mixture is mixed, in order to ensure homogeneity, and an aqueous solution of reducing agent (1.0 M) is added slowly. The mixture is then stirred, open to the atmosphere, at room temperature for a time up to 48 hours. The resultant product is recovered by centrifugation, or any other suitable means of removing the reaction solution from the product of the invention.

According to the present invention, the reducing agent to be used is a boron hydride compound and/or aluminum hydride compound, or a hydrazine compound. More specifically, the reducing agent includes but is not limited to alkali metal borohydrides, alkali earth metal borohydrides, alkali metal aluminum hydrides, dialkylaluminum hydrides and diborane, among others. These may be used singly or two or more of them may be used in a suitable combination. The salt-forming alkali metal in the reducing agent is, for example, sodium, potassium, or lithium and the alkaline earth metal is calcium or magnesium. In consideration of the case of ease of handling and from other viewpoints, alkali metal borohydrides are preferred, and sodium borohydride is particularly preferred.

Other preferred reducing agents suitable for use with the present disclosure include, but are not limited to: borohydrides such as lithium borohydride, potassium borohydride, calcium borohydride, magnesium borohydride, zinc borohydride, aluminum borohydride, lithium triethylborohydride [Super Hydride®], lithium dimesitylborohydride, lithium trisiamylborohydride, and sodium cyanoborohydride; lithium aluminum hydride, alane ($AlH_3$), alane-N,N-dimethylethylamine complex, L-Selectride® lithium tri-sec-butylborohydride)., LS-Selectride® lithium trisiamylborohydride), Red-Al® or Vitride ® (sodium bis(2-methoxyethoxy)aluminum hydride; alkoxyaluminum hydrides such as lithium diethoxyaluminum hydride, lithium trimethoxyaluminum hydride, lithium triethoxyaluminum hydride, lithium tri-t-butyoxyaluminum hydride, and lithium ethoxyaluminum hydride; alkoxy-and alkylborohydrides, such as sodium trimethoxyborohydride and sodium triisopropoxyborohydride; boranes, such as diborane, 9-BBN, and Alpine Borane®; aluminum hydride, and diisobutylaluminum hydride (Dibal); hydrazine, and the like. Together with such a reducing agent, a suitable activator known in the art may be combinedly used for improving the reducing power of the reducing agent. The reducing agent can be used in solid form, in solution with a suitable solvent, or can be attached to an inert support, such as polystyrene, alumina, and the like. The reducing agent to be used should be mostly soluble in a solvent, particularly in water (e.g., NaBH4, LiBH4, or hydrazine), or alternatively in an organic solvent which is miscible with water. For example, it is envisioned that that the process of the present disclosure can be done using an organic solvent such as tetrahydrofuran (THF) or a THF-water mixture with $LiBHEt_3$ (Super Hydride®) as the reducing agent.

The amount of the reducing agent is not particularly restricted, but it is preferred to be in an amount such that reducing agent is provided in an amount not less than the stoichiometric amount relative to the amount of the thiocarbonythio compound. For example, the reduction can be effected using sodium borohydride in an amount of not less than 0.5 mole, preferably not less than 1.0 mole, per mole of the thiocarbonylthio compound. From the economic viewpoint, the amount of reducing agent is not more than 10.0 moles, and preferably not more than 2.0 moles per mole of the thiocarbonylthio compound.

In the instance of some of the transition metals included in the present invention, and hence included within the present invention, the addition of the reducing agent results in the reduction of the dithioester end group of the polymer, resulting in the corresponding thiol functionality on the (co)polymer with the simultaneous reduction of the metal ion to the elemental state.

In addition to the above embodiments, the transition metal nanoparticles or surfaces stabilized or modified by (co)polymers synthesized using RAFT can be further modified at their terminal functional end group using a variety of reaction conditions, such as reagents, time, and temperature. Recently, there has been growing interest in using various polymeric nanoparticles as carrier systems for an increasing number of compounds, such as anti-infectious agents, anti-cancer drugs, and antibodies, due in part to the excellent controlled biodegradability and compatibility properties of these polymers. Such nanoparticles show promise in the medical field, for example, in that the combined advantages of nanoparticles or stabilized surfaces with the advantages of covalent protein-drug conjugates could enable the modification of both body distribution and the enhancement of the cellular uptake of the bound drug (Schäfer, et al., *Pharmaceutical Research* 1992, Vol. 9, pp. 541-546).

Such an embodiment of the present disclosure is illustrated below, wherein a thio functionalized polymer or (co)polymer is grafted to a surface, such as a transition metal nanoparticle, transition metal, silicon wafer, ceramic, biofilm, or the like, wherein the polymer or (co)polymer contains at least one terminal functional group (X) which is capable of further reaction with an appropriate compound Y. Accordingly, X can be selected from the group consisting of, but not limited to, —NH$_2$, —NHR, —NR$_1$R$_2$, —OH, —CO$_2$H, —CO$_2$R, COCl, COBr, COI, NO$_2$, SHR$_1$, and —R$_1$C(O)OC(O)R$_2$, wherein R, R$_1$, and R$_2$ can be alkyl, substituted alkyl, alkenyl, aryl, substituted aryl, aromatic, or heterocyclic, and include such compounds as amino acids (all isomeric forms), drugs and drug-like compounds, peptides, proteins, anhydrides, CTAs, initiators, and any number of suitable protecting groups, such as those described in Green, T. W., and Wuts, P. G. M, "Protective Groups in Organic Synthesis", 3$^{rd}$ Ed., John Wiley and Sons, Inc., 1999.

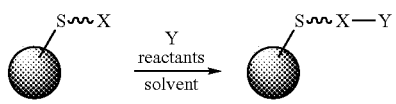

Consequently, and in accordance with the present disclosure, thiol functionalized azo-initiators could be attached, or a small molecule thiol containing a functionalizable end group (X) which is capable of further reaction could be coupled to an appropriate RAFT CTA, allowing a variety of CTAs or initiators to be attached to surfaces.

For example, the transition metal nanoparticles or surfaces of the present disclosure can be further modified chemically to enable functional groups to be generated on or near the nanoparticle or surface, which would thereby allow for covalent binding of substrates, such as antibodies, specific peptides, drugs, and the like. Particularly, it is desirable to have accessible thiol groups on or near the surface of the nanoparticles in order to achieve the coupling of various compounds to this colloidal system. This in turn can lead to the use of the nanoparticles and surfaces of the present invention for such applications as parenteral administration of medicaments.

A representative example of such a further functionalization of the transition metal nanoparticles or surfaces of the present invention is illustrated in Scheme 4. Generally, what is shown is the modification of the carboxyl structuro-terminal end group of the nanoparticle through the introduction of a sulfhydryl group onto the nanoparticle. This functionality can then be used to couple drugs via thiol-reactive cross-linkers such as maleinimide group containing substrates.

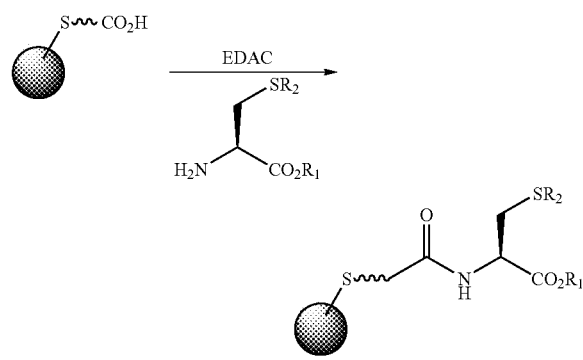

Scheme 4. Schematic representation of the coupling of thiol groups onto the transition metal nanoparticles of the present disclosure which are stabilized by (co)polymers synthesized by RAFT. R$_1$ and R$_2$ are optionally H, alkyl, aryl, etc., or an appropriate protecting group.

As illustrated in Scheme 4, the modified, sulfhydryl-containing nanoparticles can be prepared using a two-step carbodiimide technique, such as described by Ezpeleta, et al., International Journal of Pharmaceutics 1999, 191, pp. 25-32. Initial activation of the carboxylic acid groups of the nanoparticles by a carbodiimide such as 1-ethyl-3-(3-dimethylaminopropyl)carbodiimide (EDAC) or diisopropylcarbodiimide (DIC) leads to the formation of an O-isoacylurea (not shown), which is followed by the nucleophilic attack of the amine on the cysteine. This leads to the formation of nanoparticles with exposed, reactive thiol functions near their surface, attached by an amide bond. Consistent with the objectives of the present disclosure, that is to form transition metal nanoparticles in a facile manner using solvents such as water in an open-air atmosphere, any non-covalently associated cysteine, as well as the urea derivative by-product of the carbodiimide generated during the reaction, can be readily eliminated from the nanoparticles by simple washing and drying techniques. Other suitable methods for the introduction of such thiol functionalities onto nanoparticles include, for example, the coupling of cysteine and cystaminium-dichloride by an aqueous carbodiimide reaction, and the use of carbodiimides and cystamine. Since cystamine does no contain directly available sulfhydryl groups, an additional reaction step would be required in order to reduce the disulfide bonds using a sulfhydryl reducing agent such as dithiotreitol (DDT) or tris(2-carboxyethyl)-phosphine hydrochloride (TCEP).

Further embodiments of the present invention include RAFT polymerizations of polymers from a surface, such as from a nanoparticles, film, or wafer. In such an instance, either the free radical initiator or the CTA can be attached to the nanoparticle or surface by any of numerous reactions known in the art. Following such attachment, the RAFT polymerizations can be carried out in a variety of solvents, preferably water or water-solvent emulsion.

The method of using the transition metal-(co)polymer nanoparticles of this invention for immobilizing well-defined (co)polymers with α,ω-telechelic functionality to planar supports, immobilizing (co)polymers with derivitizable functionalities, and anchoring a variety of biological and chemical substances to a solid support, surface or nanoparticle has potential applications in, but is not limited to, microscopy (scanning tunneling, atomic force, angle-dependent x-ray photoelectron, Auger, and the like), structural analysis, microarrays, dendrimers, proteomics, drug delivery, immunochemistry applications, protein recognition, bioarrays, biosensors and biochips, bioelectronics (e.g. biomimetic or artificial photosynthesis), biorecognition, medical applications such as in implants, controlled drug release, artificial skin and joints, artificial organs/tissue engineering and vascular grafts, biosensors such as bioaffinity sensors, transmembrane sensors, biocatalytic (enzymatic) sensors, and other cell-based sensors, as well as other biological applications which would be evident to those of skill in the art. For example, employing hydrophilic (co)polymers in the field of bioarrays may be advantageous by reducing the extent of non-specific, hydrophobic adsorption between spacer molecules separating the surface from the bimolecular ligands to which they are attached.

The following examples are included to demonstrate preferred embodiments of the invention. It should be appreciated by those of skill in the art that the techniques disclosed in the examples which follow represent techniques discovered by the inventors to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

EXAMPLES

Metal compounds used in the present invention are purchased commercially (Sigma-Aldrich Chemical Co.), or synthesized using any number of methods known to those of skill in the art. Sources other than commercial sources may be used to obtain the transition metal salts used in the present invention. For example, novel, new transition metal salts may be utilized incorporating structural, physical, and chemical properties from different sources.

Investigation of the structures of the transition-metal stabilized nanoparticles and surfaces formed in the samples can be accomplished by using a device such as a Zeiss 109-T field emission gun (a 50 kV transmission electron microscope (TEM) with a point-to-point image resolution of 0.2 nm), and recording the structural images using an internal camera, which allows for the subsequent processing and quantitative modeling. Preparation of the TEM specimens is detailed below.

General RAFT Solution Polymerization

Each polymerization was conducted under a nitrogen atmosphere in a 25 mL round-bottomed flask equipped with a magnetic stir bar and sealed with a septum. 4,4'-azobis(4-cyanopentanoic acid) (Wako Chemical, USA) and 4-cyanopentanoic acid dithiobenzoate (prepared by literature procedures, for example as describe in Mitsukami, et al., *Macromolecules* 2001, Vol. 34, pp. 2248-2256) were employed as the initiator and RAFT chain transfer agent (CTA), respectively. The [CTA]:[initiator] remained constant at 5:1 (mole basis). The monomer concentration was 2.0 M. The (co)polymers resulting were purified by dialysis against deionized water and isolated by lyophilization.

Homopolymers of sodium 4-styrenesulfonate (NaPSS) and (ar-vinylbenzyl)trimethylammonium chloride (VBTAC) were synthesized in water (pH 7.0) (PNaPSS: $M_n$=19,800, PDI=1.12; PVBTAC: $M_n$=10,500, PDI=1.06). The homopolymerization of N,N-dimethylacrylamide (DMA) was conducted in water (pH 7.5) at 70° C. ($M_n$=29,100, PDI=1.18). An AB diblock copolymer of 3-[2-(N-methylacrylamido)-ethyldimethyl ammonio] propane sulfonate (MAEDAPS) and DMA was prepared by first synthesizing PMAEDAPS in 0.5 M NaBr. The resulting homopolymer was then used as a macro-CTA, with 4,4'-azobis(4-cyanopentanoic acid) as the initiator, allowing the synthesis of a block copolymer in 0.5 M NaBr. (P(MAEDAPS-b-DMA), $M_n$=58,700, PDI=1.19, MAEDAPS: DMA=35:65).

Example 1

Preparation of Polymer-Stabilized Gold Particles

Preparation. Colloidal gold (0.01 wt. % as $HAuCl_4$, 20 nm) was prepared as previously described, or purchased from a commercial supplier. To a test tube equipped with a magnetic stir bar and containing a dithioester end-capped polymer (PDMA, PVBTAC, P(MAEDAPS-b-DMA), or PDMA diheaded) (255 mg) was added a solution of colloidal gold (Aldrich, 1.02 g, 0.01 wt. %). The mixture was stirred to ensure homogeneity. Aqueous 1M $NaBH_4$ (~2 mL) was added dropwise and the mixture was allowed to continue stirring at room temperature for 48 hours. An aliquot (0.50 mL) from the resulting solution was removed and centrifuged for 1 hour at 13,000 rpm. The supernatant was removed and the resulting aggregate was rinsed with deionized water (0.50 mL) with brief agitation. The supernatant was again removed and the aggregate was redispersed in deionized water (0.50 mL) by agitation for 24 hours.

Characterization. For the observation of the size and distribution of the colloidal nanoparticles, a drop of the colloidal solution was placed on a Formvar-coated copper grid and allowed to air-dry. Transmission electron microscopy (TEM) was performed as described above, operating at an accelerating voltage of 50 kV. UV-VIS spectroscopy of the nanoparticles was conducted in 1 cm path length cuvettes with a Hewlett Packard 8452A diode array spectrophotometer.

Example 2

Preparation of Polymer-Stabilized Silver Particles

Preparation. The colloidal silver solution was prepared in situ from a silver salt (i.e. $AgNO_3$). The appropriate amount of silver salt was added to deionized water (20.0 mL) in order to prepare a 0.01 wt. % solution of the silver ion. The polymer was dissolved in an aliquot of this solution and a similar procedure as described above in Example 1 was employed in order to prepare the polymer-stabilized colloidal solution.

Example 3

Preparation of Polymer-Stabilized Platinum Particles

Preparation. The colloidal platinum solution was prepared in situ from a platinum salt (i.e. $Na_2PtCl_6.6H_2O$). The appropriate amount of platinum salt was added to deionized water (20.0 mL) in order to prepare a 0.01 wt. % solution of the platinum ion. The polymer was dissolved in an aliquot of this solution and a similar procedure as described above in Example 1 was employed in order to prepare the polymer-stabilized colloidal solution.

Example 4

Preparation of Polymer-Stabilized Palladium Particles

Preparation. The colloidal palladium solution was prepared in situ from a palladium salt (i.e. $Na_2PdCl_6$). The appropriate amount of palladium salt was added to deionized water (20.0 mL) in order to prepare a 0.01 wt. % solution of the palladium ion. The polymer was dissolved in an aliquot of this solution and a similar procedure as described above in Example 1 was employed in order to prepare the polymer-stabilized colloidal solution.

Example 5

Preparation of Polymer-Stabilized Rhodium Particles

Preparation. The colloidal rhodium solution was prepared in situ from a rhodium salt (i.e. $Na_3RhCl_6$). The appropriate amount of rhodium salt was added to deionized water (20.0 mL) in order to prepare a 0.01 wt. % solution of the rhodium ion. The polymer was dissolved in an aliquot of this solution and a similar procedure as described above in Example 1 was employed in order to prepare the polymer-stabilized colloidal solution.

Example 6

Preparation of Polymer-Stabilized Ruthenium Particles

Preparation. The colloidal ruthenium solution was prepared in situ from a ruthenium salt (i.e. $K_3RuCl_6$). The appropriate amount of ruthenium salt was added to deionized water (20.0 mL) in order to prepare a 0.01 wt. % solution of the ruthenium ion. The polymer was dissolved in an aliquot of this solution and a similar procedure as described above in Example 1 was employed in order to prepare the polymer-stabilized colloidal solution.

Example 7

Preparation of Polymer-Stabilized Osmium Particles

Preparation. The colloidal osmium solution was prepared in situ from a osmium salt (i.e. $Na_2OsCl_6 \cdot H_2O$). The appropriate amount of osmium salt was added to deionized water (20.0 mL) in order to prepare a 0.01 wt. % solution of the osmium ion. The polymer was dissolved in an aliquot of this solution and a similar procedure as described above in Example 1 was employed in order to prepare the polymer-stabilized colloidal solution.

Example 8

Preparation of Polymer-Stabilized Iridium Particles

Preparation. The colloidal iridium solution was prepared in situ from an iridium salt (i.e. $Na_2IrCl_6 \cdot H_2O$). The appropriate amount of iridium salt was added to deionized water (20.0 mL) in order to prepare a 0.01 wt. % solution of the iridium ion. The polymer was dissolved in an aliquot of this solution and a similar procedure as described above in Example 1 was employed in order to prepare the polymer-stabilized colloidal solution.

Example 9

Immobilization of RAFT-Prepared (Co)Polymers onto Gold Film

Gold-coated glass slides (1 cm×1 cm×1000 Å) were obtained from EMF Corporation (Ithaca, N.Y.). Immediately prior to use, the slides were immersed for 2 minutes in freshly prepared "piranha" solution (70/30, v/v, concentrated $H_2SO_4$/30% $H_2O_2$) at 80° C., rinsed with deionized water, and dried under a nitrogen atmosphere. The surface modification reactions involved dropwise addition of aqueous $NaBH_4$ (0.5 mL, 1.0 M) to a solution of dithioester end-capped polymer (PDMA, PVBTAC, P(MAEDAPS-b-DMA), or PDMA diheaded) in deionized water (5.0 mL, 0.1 mM). The gold-coated slides were placed in the solution of newly-formed thiols for 48 hours. The slides were then removed from the supernatant, rinsed by constant agitation in deionized water for 48 h, and dried under a nitrogen atmosphere.

Characterization: Tapping mode atomic force microscopy (AFM) images were collected using a Digital Instruments 3000 scanning probe microscope. Each slide was examined at a minimum of three different locations on the sample surface.

Surface hydrophobicity was examined by performing water contact angle measurements with a First Ten Angstroms FTÅ 200 Dynamic Contact Angle Analyzer. Three sets of contact angle measurements were collected, using a 10 μl drop size of deionized, distilled water. Between measurements, samples were dried in an oven at 55° C. for 10 minutes.

The results of the water contact angle measurements are shown in Table 2. All of the films demonstrated reduced contact angles as compared to the unmodified gold, thereby suggesting a surface transition to a more hydrophilic state. The contact angle obtained for the unmodified gold containing adventitious, nonpolar material is similar to that reported in the art. This reduction in contact angle following the polymer immobilization procedures of the present disclosure is expected owing to the extremely hydrophilic nature of the (co)polymers employed.

TABLE 2

Water contact angle measurements obtained for gold films modified with various (co)polymers.

| Modifying (co)polymer | Water Contact Angle (deg) |
|---|---|
| No Polymer (control) | 75.9° |
| NaPSS | 67.3° |
| PDMA | 30.5° |
| P(MAEDAPS-b-DMA) | 29.1° |
| PMAEDAPS | 41.5° |
| PVBTAC | 41.4° |

Interestingly, the contact angle for the P(MAEDAPS-b-DMA) sample (29.1°) was nearly identical to that of the PDMA-modified gold (30.5°) and similar to the contact angle reported by Baum et al. (*Macromolecules* 2002, Vol. 35, pp. 610-615) for PDMA brushes grafted from a silicate surface (33°). This result was striking because the dithioester resides at the terminus of the DMA block, and following attachment, the outer block is expected to be MAEDAPS. However, due to the similarity of the contact angles is observed for the block copolymer and PDMA samples, while not intending to be held to one particular hypothesis, it seems likely that the DMA block was exposed.

In order to gain further insight, the contact angle was determined for a gold film modified with MAEDPAS homopolymer. PMAEDAPS is derived from a sulfobetaine monomer that contains both positive and negative charges on the same repeat unit. As a result of the electrostatic interactions between the opposite charges, polybetaines are not soluble in deionized water but are soluble in aqueous salt solutions. The water contact angle for the gold modified with PMAEDAPS was determined to be 41.5°, indicating the surface was more hydrophobic than the gold modified with the block copolymer. This result, coupled with the similarity observed between the contact angles of the PDMA and the P(MAEDAPS-b-DMA) samples, suggest the relatively hydrophobic MAEDAPS block causes the block copolymer to adopt a conformation such that the more hydrophilic DMA block is exposed to the aqueous environment. Rearrangement of the blocks most likely occurred when the sample was treated with deionized water during the rinsing step that immediately followed the immobilization procedure.

Attenuated total reflectance Fourier transform infrared (ATR FT-IR) spectra were obtained with a Digilab FTS-6000 FT-IR single-beam spectrometer set at a 4 $cm^{-1}$ resolution. A 45° face angle Ge crystal with 50×20×3 mm dimensions was used. This configuration allows the analysis of the film-air interface from monolayer levels to approximately 0.2 μm from the surface. Each spectrum represents 5000 co-added scans ratioed to 5000 co-added reference scans that were collected using an empty ATR cell. All spectra were corrected for spectral distortions and optical effects using Q-ATR software. Molecular weights and polydispersities were determined by aqueous size exclusion chromatography.

PROPHETIC EXAMPLES

The following prophetic examples are meant to describe alternative procedures and embodiments of the present disclosure which have been envisioned by the inventors.

Prophetic Example 1

Preparation of Polymer-Stabilized Gold Particles using LiBHEt$_3$ (Super Hydride®) as the Reducing Agent Colloidal gold (0.01 wt. % as HAuCl$_4$, 20 nm) is prepared as previously described, or purchased from a commercial supplier. To a test tube equipped with a magnetic stir bar and containing a dithioester end-capped polymer (PDMA, PVBTAC, P(MAEDAPS-b-DMA), or PDMA diheaded) (255 mg) is added a solution of colloidal gold (Aldrich, 1.02 g, 0.01 wt. %). The mixture is stirred to ensure homogeneity. A 1.0 M solution of LiBHEt$_3$ (~2 mL) in THF is added dropwise and the mixture is allowed to continue stirring at room temperature for 48 hours. An aliquot (0.50 mL) from the resulting solution is removed and centrifuged for 1 hour at ~13,000 rpm. The supernatant is removed and the resulting aggregate is rinsed with deionized water (0.50 mL) with brief agitation. The supernatant is again removed and the aggregate is redispersed in deionized water (0.50 mL) by agitation for 24 hours. Analysis of the size and distribution of the colloidal nanoparticles by TEM and UV-VIS spectroscopy gives results similar to those described in the examples above.

Prophetic Example 2

Preparation of Polymer-Stabilized Iridium Particles Using Hydrazine as the Reducing Agent Colloidal iridium (0.01 wt. % as Na$_2$IrCl$_6$.6H$_2$O, 20 nm) is prepared as previously described, or purchased from a commercial supplier. To a test tube equipped with a magnetic stir bar and containing a dithioester end-capped polymer (PDMA, PVBTAC, P(MAEDAPS-b-DMA), or PDMA diheaded) (255 mg) is added a solution of colloidal iridium (Aldrich, 0.01 wt. %). The mixture is stirred to ensure homogeneity. A 1.0 M solution of hydrazine (H$_2$NNH$_2$.H$_2$O, ~2 mL) in water, THF, or a water-THF mixture is added dropwise and the mixture is allowed to continue stirring at room temperature for 48 hours. An aliquot (0.50 mL) from the resulting solution is removed and centrifuged for 1 hour at 13,000 rpm. The supernatant is removed and the resulting aggregate is rinsed with deionized water (0.50 mL) with brief agitation. The supernatant is again removed and the aggregate is redispersed in deionized water (0.50 mL) by agitation for 24 hours. Analysis of the size and distribution of the colloidal nanoparticles by TEM and UV-VIS spectroscopy gives results similar to those described in the examples above.

Prophetic Example 3

Immobilization of RAFT-Prepared (Co)Polymers onto Silicon Wafers

Preparation of substrate: A freshly cleaned ("piranha" solution) silicon wafer is placed into a solution of a silane (either a monofunctional or trifunctional chlorosilane) in an appropriate solvent, such as toluene. The reaction is allowed to react at ambient temperature for approximately 12 h under an inert atmosphere. The modified substrate is then rinsed with an organic solvent and dried.

Surface-Initiated RAFT Polymerization: A reaction vessel containing functionalized silicon substrate is charged with monomer, appropriate solvent or solvents, free-radical initiator (e.g. AIBN or other suitable initiator) and/or a dithio CTA (e.g, DTBA). The solution is degassed, then heated to the appropriate temperature, depending upon the reactants, for an appropriate time period. Following the completion of polymerization, the modified substrate is extracted, washed and dried (e.g. vacuum). Characterization is by any number of appropriate techniques, such as $^1$H-NMR, FTIR-ATR, TGA, DSC and XPS.

Prophetic Example 4

Thiolation of Transition Metal Nanoparticles using Cysteine (c.f., Scheme 3)

Preparation of transition metal nanoparticles: Nanoparticles or surfaces are prepared according the examples given above, e.g. examples 1-9, using PDMA, NaPSS, PVBTAC or P(MAEDAPS-b-DMA) as the (co)polymers. Characterization is by any number of methods, such as TEM or photon correlation spectroscopy.

Introduction of thiol functionality: The carboxylic groups on the transition metal nanoparticles (or surface) is activated in an appropriate solution (e.g., water, organic solvent, phosphate buffer, etc.) by dropwise addition of a solution of EDAC. The mixture is incubated at room temperature for a time sufficient to allow complete activation of a majority of the carboxyl groups. The unreacted EDAC is then removed, the nanoparticles (or modified surface) washed briefly, and then resuspended in solution. Cysteine hydrochloride (L-, D-, or a racemic mixture) is made up in solution, and added to the suspension containing the activated nanoparticles. The mixture is shaken or agitated gently at room temperature for a time necessary to allow the reaction to go to completion. The conjugated nanoparticles are washed using any appropriate means (e.g., centrifugation) in order to remove any cysteine remaining. Analysis of the thiol functionalized products includes the use of Ellman's reagent to determine the number of thiol groups on the nanoparticle surface.

The colloidal metal particles and surfaces, as used herein, are prepared following known art procedures, or purchased commercially. The colloidal metal particles and surfaces may then be attached, and consequently stabilized, to (co)polymers in aqueous solution which have been prepared by the RAFT process. It has been shown (U.S. Pat. No. 4,775,636; Moeremans, et al.) that colloidal metal particles which are attached to binding agents (proteins, for example) will accumulate at specific binding sites and hence become visible as the color characteristics of the colloidal metal particles used, e.g. from pink to dark red color, in the case of gold. This signal can be detected by eye, or by using any of a number of known spectrophotometric techniques. Similarly, the transition metal nanoparticles and surfaces of this invention which are modified by RAFT synthesized (co)polymers exhibited similar characteristics. These results are shown in Table 3.

TABLE 3

Visible color characteristics of the colloidal transition metal nanoparticles of examples 1-8.

| Metal (Salt Used) | Polymer | Sol'n color before reduction | Sol'n color after reduction | Sol'n color, 48 h |
|---|---|---|---|---|
| Au HAuCl$_4$.H$_2$O | PDMA | Red | Purple | Pink |
| | PVBTAC | | Purple | Purple |
| | P(MAEDAPS-b-DMA) | | Purple | Purple |
| | PDMA Diheaded | | Pink | Pale pink |
| | Control (no polymer) | | w.w. | Slight ppt. |
| Ag AgNO$_3$ | PDMA | w.w. | Dark green/brown | w.w., slight ppt. |
| | PVBTAC | | Green/grey | Amber |
| | P(MAEDAPS-b-DMA) | | v. dark brown | Pale brown |
| | PDMA Diheaded | | — | — |
| | Control (no polymer) | | Black ppt. | Black ppt. |
| Pt Na$_2$PtCl$_6$.6H$_2$O | PDMA | w.w. | w.w. | w.w. |
| | PVBTAC | | w.w. | Pale brown |
| | P(MAEDAPS-b-DMA) | | w.w. | w.w. |
| | PDMA Diheaded | | — | — |
| | Control (no polymer) | | w.w. | Black ppt. |
| Pd Na$_2$PdCl$_6$.4H$_2$O | PDMA | Golden orange | Pale brown | w.w. |
| | PVBTAC | | Orange/brown | w.w. |
| | P(MAEDAPS-b-DMA) | | Orange/brown | w.w. |
| | PDMA Diheaded | | — | — |
| | Control (no polymer) | | Black ppt. | Black ppt. |
| Ir Na$_2$IrCl$_6$.6H$_2$O | PDMA | Dark gold/yellow | w.w. | w.w |
| | PVBTAC | | w.w. | Clear pale brown, slight ppt. |
| | P(MAEDAPS-b-DMA) | | w.w. | w.w. |
| | PDMA Diheaded | | w.w. | w.w. |
| | Control (no polymer) | | w.w. | v. slight ppt. |
| Rh NaRhCl$_6$ | PDMA | w.w. | w.w. | Grey/black, v. slight ppt. |
| | PVBTAC | | w.w. | Clear gold, v. slight ppt. |
| | P(MAEDAPS-b-DMA) | | Yellow/brown | Clear brown, v. slight ppt. |
| | PDMA Diheaded | | Yellow/brown | w.w., v. slight ppt. |
| | Control (no polymer) | | Black ppt. | Black ppt. |
| Os Na$_2$OsCl$_6$.H$_2$O | PDMA | Pale yellow/green | w.w. | w.w. |
| | PVBTAC | | w.w. | w.w., v. slight ppt. |
| | P(MAEDAPS-b-DMA) | | w.w. | w.w., v. slight ppt. |
| | PDMA Diheaded | | w.w. | w.w. |
| | Control (no polymer) | | w.w. | v. slight ppt. |
| Ru K$_3$RuCl$_6$ | PDMA | Pale brown/green | v. pale yellow | Clear pale brown |
| | PVBTAC | | v. pale yellow | Clear pale brown |
| | P(MAEDAPS-b-DMA) | | v. pale yellow | Clear pale brown |
| | PDMA Diheaded | | v. pale yellow | Clear pale brown |
| | Control (no polymer) | | Black ppt. | Black ppt. | w.w. = water white;
v = very;
ppt. = precipitate.

All of the processes disclosed and claimed herein can be made and executed without undue experimentation in light of the present disclosure. While the compositions and methods of this invention have been described in terms of preferred embodiments, it will be apparent to those of skill in the art that variations may be applied to the processes and in the steps or in the sequence of steps of the methods described herein without departing from the concept, spirit and scope of the invention. More specifically, it will be apparent that certain agents which are chemically related may be substituted for the agents described herein while the same or similar results would be achieved. All such similar substitutes and modifications apparent to those skilled in the art are deemed to be within the spirit, scope and concept of the invention.

What is claimed is:

1. A method of producing nanoparticles stabilized by (co)polymers synthesized using Reversible Addition-Fragmentation chain Transfer (RAFT), comprising:
    forming a dithio end-capped (co)polymer by reacting a polymerizable monomer or co-monomers with a free radical source and a chain transfer agent (CTA) using the RAFT method in a solvent;
    obtaining metal precursor colloidal nanoparticles in a solution;
    contacting the metal precursor colloidal nanoparticles with the dithio end-capped (co)polymer; and
    introducing a reducing agent into the solution.

2. The method according to claim 1 further comprising:
    concentrating the stabilized nanoparticles and removing by-products of synthesis which remain in solution;
    adding a solvent and agitating the nanoparticles to redisperse the stabilized nanoparticles; and
    concentrating the stabilized nanoparticles in a manner such as to minimize aggregation.

3. The method according to claim 1, wherein the solvent comprises water.

4. The method according to claim 1 wherein the forming and introducing steps are performed open to the atmosphere.

5. The method according to claim 1, wherein the free radical source is a free radical initiator selected from the group consisting of azo-compounds, peroxides, redox systems, and reducing sugars.

6. The method according to claim 5, wherein the azo-compounds are selected from the group consisting of AIBMe, AIBN, ACP, AB, azobis(2-aminopropane)-dichloride, and dithionate compounds.

7. The method according to claim 5, wherein the peroxides are selected from the group consisting of hydrogen peroxide, tert-butyl peroxide, cumene hydroperoxide, tert-butyl peroxyacetate, lauroyl peroxide, dibenzoyl peroxide, and ammonium persulphate.

8. The method according to claim 5, wherein the redox systems are selected from the group consisting of mixtures of hydrogen peroxide, alkyl peroxide, peresters, and percarbonates, in combination with any one of the salts of iron, titaneous salts, zinc salts, zinc formaldehyde sulphoxylate, sodium salts, and sodium formaldehyde sulphoxylate.

9. The method according to claim 1, wherein the CTA is selected from the group consisting of dithioester compounds, disulphides, xanthate disulphides, and dithiocarbonates.

10. The method according to claim 9, wherein the CTA is DTBA (4-cyanopentanoic acid dithiobenzoate).

11. The method according to claim 1, wherein the obtaining metal precursor colloidal nanoparticle step includes forming a colloidal metal precursor solution as a complex of the transition metal at room temperature in water.

12. The method according to claim 1, wherein the obtaining metal precursor colloidal nanoparticle step comprises forming a colloidal metal precursor solution from a salt of the transition metal and water at room temperature.

13. The method according to claim 1, wherein the nanoparticles comprise transition-metal based nanoparticles selected from the group of metals comprising the second and third series of the d-block of the Periodic Table.

14. The method according to claim 13, wherein the transition metal based nanoparticles comprise transition metals having tetrahedral or octahedral geometries.

15. The method according to claim 1, wherein the metal precursor colloidal nanoparticle solution includes a metal system selected from the group consisting of $Na_2IrCl_6 \cdot 6H_2O$, $Na_2OsCl_6 \cdot H_2O$, $K_3RuCl_6$, $Na_3RhCl_6$, $PtOAc_2$, $Na_2PtCl_6 \cdot 6H_2O$, $Na_2PdCl_6 \cdot 4H_2O$, $AgNO_3$, $HAuCl_4$, $H_2PtCl_6$, $H_2IrCl_6$, and $H_2OsCl_6$.

16. The method according to claim 1, wherein the reducing agent includes at least one compound selected from the group consisting of $NaBH_4$, $KBH_4$, $LiBH_4$, $Ca(BH_4)_2$, $Mg(BH_4)_2$, $Zn(BH_4)_2$, $Al(BH_4)_3$, $LiAlH_4$, $NaBH_3CN$, $H_2NNH_2$, $B_2H_6$, 9-BBN, lithium tri-sec-butylborohydride, lithium trisiamylborohydride, $LiAlH(OtBu)_3$, $LiAlH(OMe)_3$, $LiAlH(OEt)_3$, $Li(mesityl)_2BH_2$, $Li(siamyl)_3BH$, $NaBH(OMe)_3$, and $NaBH(OiPr)_3$.

17. The product of the process of claim 1.

* * * * *